United States Patent
Thomas et al.

(10) Patent No.: US 6,426,107 B1
(45) Date of Patent: Jul. 30, 2002

(54) SYSTEM AND METHOD FOR PROCESSING CITRUS FRUIT WITH ENHANCED OIL RECOVERY AND JUICE QUALITY

(75) Inventors: Don Thomas, Lakeland, FL (US); Alex Schuermans, Sao Paulo (BR); Michael L. Suter, Spring Hill; Salvador Garcia, Lakeland, both of FL (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/576,924

(22) Filed: May 23, 2000

(51) Int. Cl.[7] .............................................. A23L 1/212
(52) U.S. Cl. ..................... 426/483; 426/482; 426/616
(58) Field of Search ................................ 426/483, 482, 426/616

(56) References Cited

U.S. PATENT DOCUMENTS

| | | | |
|---|---|---|---|
| 3,745,914 A | 7/1973 | Wallace | 99/630 |
| 3,854,395 A | 12/1974 | Hirahara | 99/630 |
| 4,062,985 A | 12/1977 | Amstad | 426/483 |
| 4,070,959 A | 1/1978 | Bushman et al. | 99/510 |
| 4,132,162 A | 1/1979 | Magnuson | 99/630 |
| 4,225,628 A | 9/1980 | Lynn | 426/549 |
| 4,519,305 A | 5/1985 | Vanosdall | 99/625 |
| 4,729,299 A | * 3/1988 | Hatch | |
| 5,105,734 A | * 4/1992 | Foxcroft et al. | |
| 5,843,508 A | 12/1998 | Fuhrman | 426/483 |
| 5,858,429 A | 1/1999 | Wallace | 426/231 |
| 5,989,615 A | * 11/1999 | Bernard | |
| 5,992,311 A | 11/1999 | Suter et al. | 100/37 |

FOREIGN PATENT DOCUMENTS

FR 2161331 6/1973

OTHER PUBLICATIONS

Product Sheet, Vanmark Peeler/Washer, Series 2800, Vanmark Corporation, Date Not Provided.
Advertising, Peeling Without Waste Water. A Speciality of Dornow Food Technology, 1989.
Product Sheet, Lyco Electrically Driven Peeler/Washers, Lyco Manufacturing, Inc., Date Not Provided.

* cited by examiner

Primary Examiner—Anthony J. Weier
(74) Attorney, Agent, or Firm—Allen, Dyer, Doppelt, Milbrath & Gilchrist, P.A.

(57) ABSTRACT

A method and system of processing citrus fruit is shown. A peeling chamber has opposing ends and a fruit inlet and fruit outlet formed at respective opposing ends. Abrasive rollers are rotatably mounted in an arcuate configuration within the peeling chamber at an area forming a lower portion of the peeling chamber. Citrus fruit is fed into the peeling chamber through the fruit inlet to the fruit outlet. The citrus fruit engages the rotating abrasive rollers with a residence time within the peeling chamber for peeling off the outer surface of the fruit in an amount sufficient to remove a majority of the oil within the citrus fruit and leaving sufficient peel thickness for maintaining peel integrity.

19 Claims, 8 Drawing Sheets

SYSTEM AND METHOD FOR PROCESSING CITRUS FRUIT WITH ENHANCED OIL RECOVERY AND JUICE QUALITY

FIELD OF THE INVENTION

This invention relates to the field of processing citrus fruit, and more particularly, this invention relates to the field of processing citrus fruit and facilitating oil recovery versus juice yield.

BACKGROUND OF THE INVENTION

Oil recovery versus juice yield is becoming an increasingly important aspect of citrus fruit processing. Many factors go into the processing of citrus fruit, including the use of much water, the removal of trash, black mold, pesticides and other matter from the surface of the fruit, and other factors. One proposed method uses a vegetable peeler with an elongate auger and abrasive rollers to remove all the oil from the citrus fruit by removing a substantial amount of the surface. However, this process does not maintain peel integrity and is not advantageous for many types of citrus fruit processing, such as oranges.

SUMMARY OF THE INVENTION

The present invention now allows for the processing of citrus fruit, such as oranges or grapefruit, and also provides a pre-wash, while recovering oil before juice extraction in an amount sufficient to remove a majority of the oil within the citrus fruit while leaving sufficient peel thickness for maintaining peel integrity.

In accordance with the present invention, the method and system allows for the processing of citrus fruit, such as oranges and grapefruit, with enhanced oil recovery versus juice yield. A peeling chamber has two opposing ends and sides. A fruit inlet and fruit outlet are formed at respective ends. A plurality of abrasive rollers are rotatably mounted in an arcuate configuration within the peeling chamber at an area forming a lower portion of the peeling chamber. Citrus fruit is fed into the fruit inlet and through the peeling chamber and out from the fruit outlet. The citrus fruit engages against the rotating abrasive rollers. The residence time of the fruit within the chamber allows for the peeling off of the outer surface of the fruit in an amount sufficient to remove a majority of the oil within the citrus fruit, but leaving sufficient peel thickness for maintaining peel integrity.

It was found through much experimentation that the method and system is operable best when the abrasive rollers are stainless steel and have a knurl cut with peaks of about 0.050 inches. Water is sprayed within the peeling chamber against the citrus fruit and substantially along the Interior of the peeling chamber as the citrus fruit is fed through the peeling chamber. The water is sprayed from water spray nozzles positioned along both sides of the peeling chamber interior for ensuring that oil is washed down with the sprayed water as an emulsion. The citrus fruit is fed through the peeling chamber by rotating a feed auger that extends longitudinally through the peeling chamber from the inlet to the outlet. The feed auger is typically rotated in a direction opposite to the rotation direction of the feed auger to force the fruit downward against the abrasive rollers.

In yet another aspect of the present invention, the oil concentration is measured within the oil emulsion as it exits the peeling chamber and one of the at least residence time of the fruit within the peeling chamber, the rotation speed of the abrasive rollers, or the amount of water sprayed onto the citrus fruit is adjusted.

The fruit is advanced from the peeling chamber into a Juice extractor for extracting juice and oil from the citrus fruit. The oil concentration of the fruit juice received from the extractor is monitored and at least one of the residence time of the fruit within the peeling chamber, the rotation speed of the abrasive rollers, the amount of water sprayed onto the citrus fruit within the peeling chamber, or the amount of water used by the juice extractor is adjusted in response to a measured oil concentration that is not within a predetermined range. It is also possible to adjust the amount of fruit that is fed into the peeling chamber based on the measured oil concentration, such as by adjusting the feed of the fruit into the peeling chamber.

After the fruit passes through the peeling chamber, the surface of the citrus fruit is scanned for determining the peel integrity and also determining the quantity of fruit that has been processed out of the peeling chamber. Based upon this scanned surface, at least one of the residence time of fruit within the peeling chamber, the rotation speed of the abrasive rollers, the amount of water sprayed onto the citrus fruit, or the amount of water used by the extractor in response to a measured peel deviation can be adjusted. In yet another aspect of the present invention, it is possible to adjust the quantity of fruit fed into the peeling chamber.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention is advantageous because it provides much greater control over oil recovery relative to juice yield, reducing juice oil and allowing an operator to control the juice oil in relationship to yield. Oil concentration can be monitored manually or automatically. Not only is the oil reduced in juice, but also recovery of the oil is improved. The present invention also allows an improved efficiency relative to centrifuging. In many instances, centrifuging after extraction is eliminated altogether.

With the present invention, volatile organic compounds (VOC) at the extractor and feed mill are reduced. Because the citrus fruit is initially washed within the peeling chamber, pesticides can be removed. Also, because a small portion of the citrus fruit surface is removed (e.g., about 0.001 to 0.005 inches or more), black mold and surface defects are removed at this stage.

Figure 1:
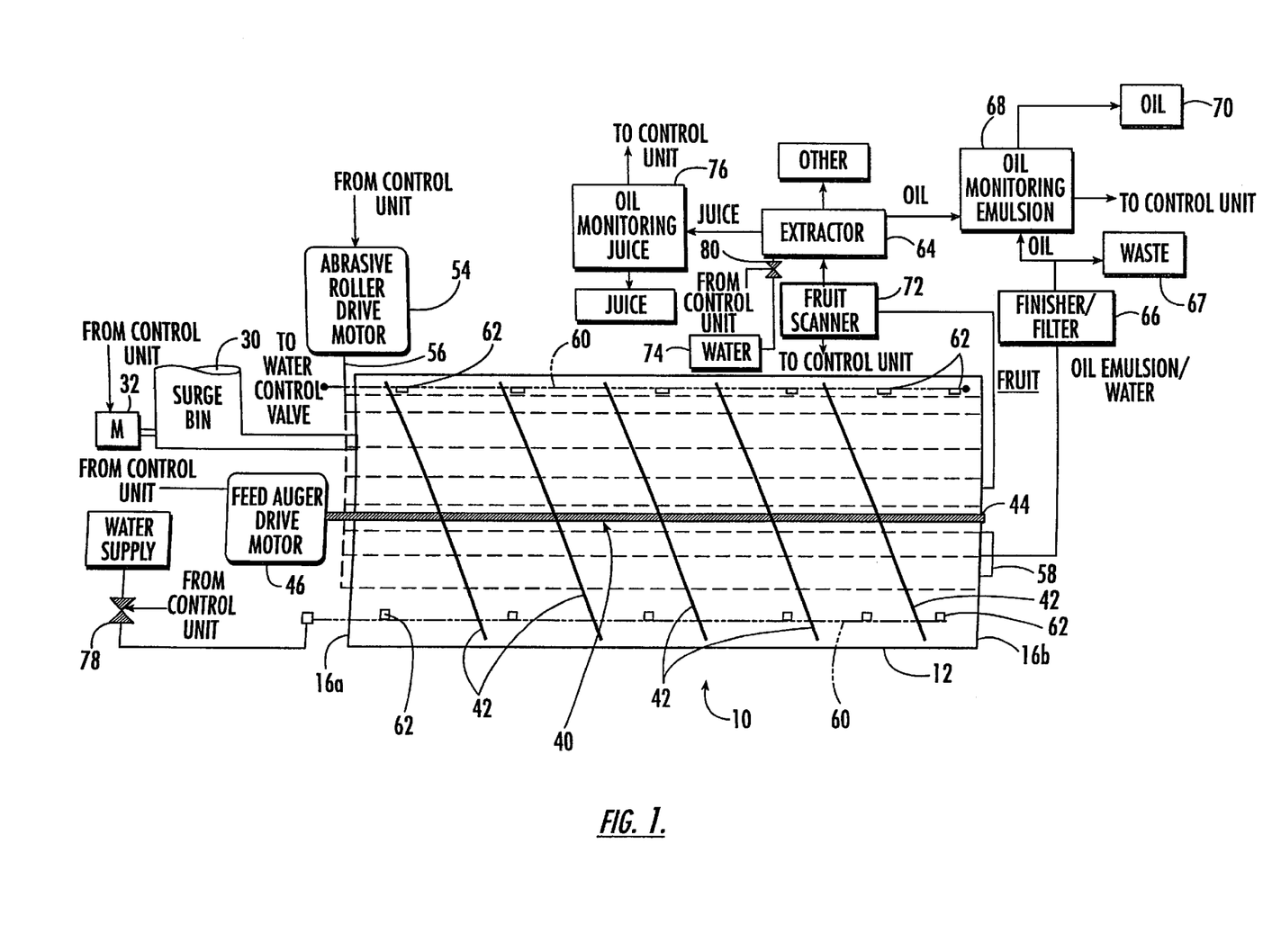
FIG. 1 is a fragmentary and schematic plan view of the system used for processing citrus fruit, showing the peeling chamber, drive motors, abrasive rollers, feed auger, inlet and outlet for the citrus fruit, the water spray system, and various sensors and other processing components.
Figure 2:
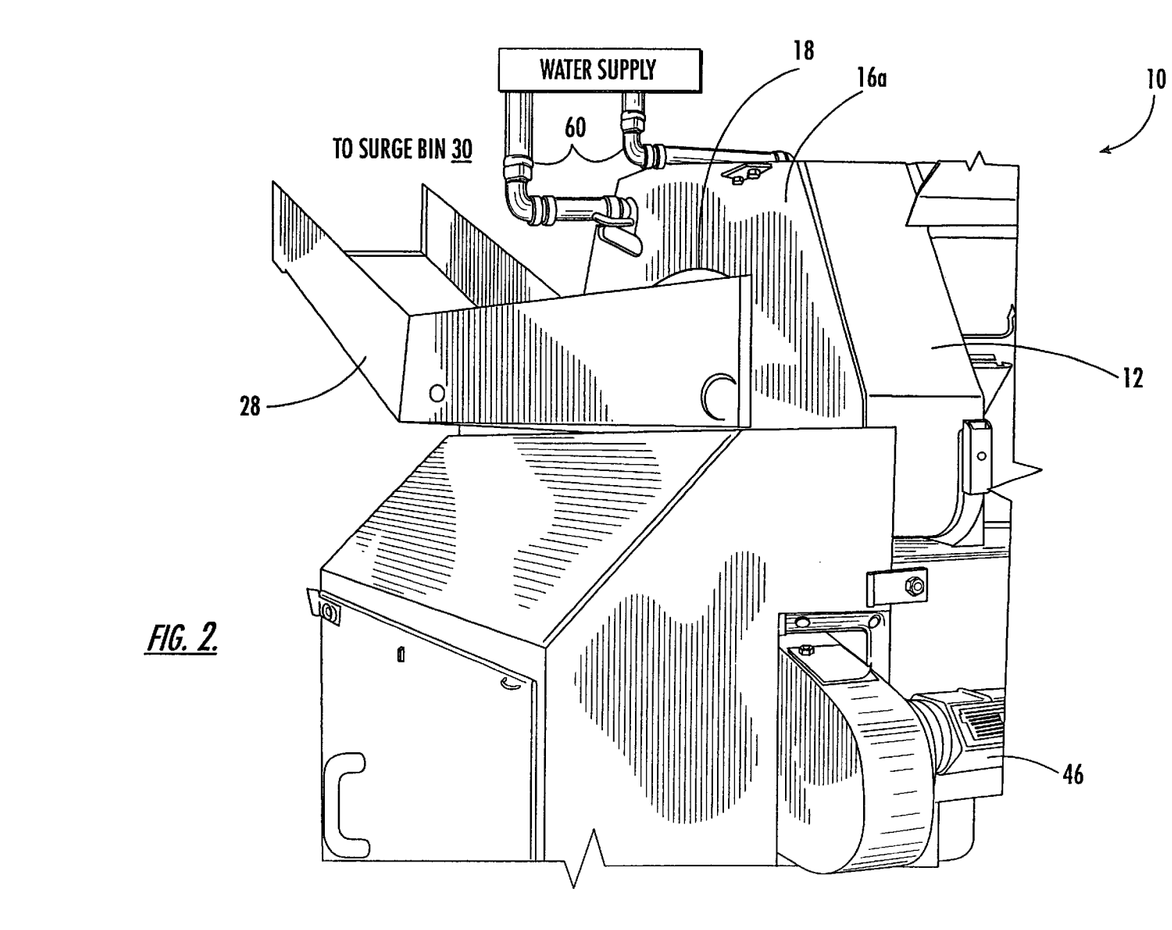
FIG. 2 is a schematic, isometric view of the intake area containing the inlet to the peeling chamber.

Referring now to FIG. 1, there is illustrated a peeling chamber 10 in accordance with the present invention. The peeling chamber 10 is similar in design to the abrasive peeling apparatus used by the potato processing industry. Substantial modifications, however, have been made in accordance with the present invention to the process to obtain the improved oil recovery relative to juice yield. Examples of various abrasive peeling apparatus using a feed auger and abrasive rollers are disclosed in U.S. Pat. Nos. 3,745,914; 4,132,162; 4,062,985; and 3,854,395, assigned to the present assignee, FMC Corporation, the disclosure which is hereby incorporated by reference in its entirety.

The peeling chamber 10 (i.e., abrasive de-oiler) includes a housing 12 supported on legs 14 (FIG. 4) forming a longitudinally extending hopper. The housing 12 defines the outer shell of a hopper for the peeling chamber 10. The housing 12 is longitudinally extending, having opposing ends 16a, 16b, which includes a respective fruit inlet 18 and fruit outlet 20. The housing 12 has a lower portion 22 and an upper portion 24. The upper portion 24 has two opposing access doors 26 covering access openings 26a. The doors fold upward and outward to facilitate access to various components mounted within the peeling chamber 10.

The fruit inlet 18 is formed within the end wall 16a and a fruit intake chute 28 is secured onto the end wall 16a to allow fruit fed from the chute to pass into the peeling chamber. Citrus fruit, such as oranges, are supplied by a surge bin 30 (FIG. 1) having a feed motor 32 for adjusting the amount of fruit that is fed from the surge bin 30 into the chute 28, and thus, into the peeling chamber. Although most types of fruits having an outer peel can be processed, the present invention is particularly advantageously designed for use with oranges.

Figure 5:
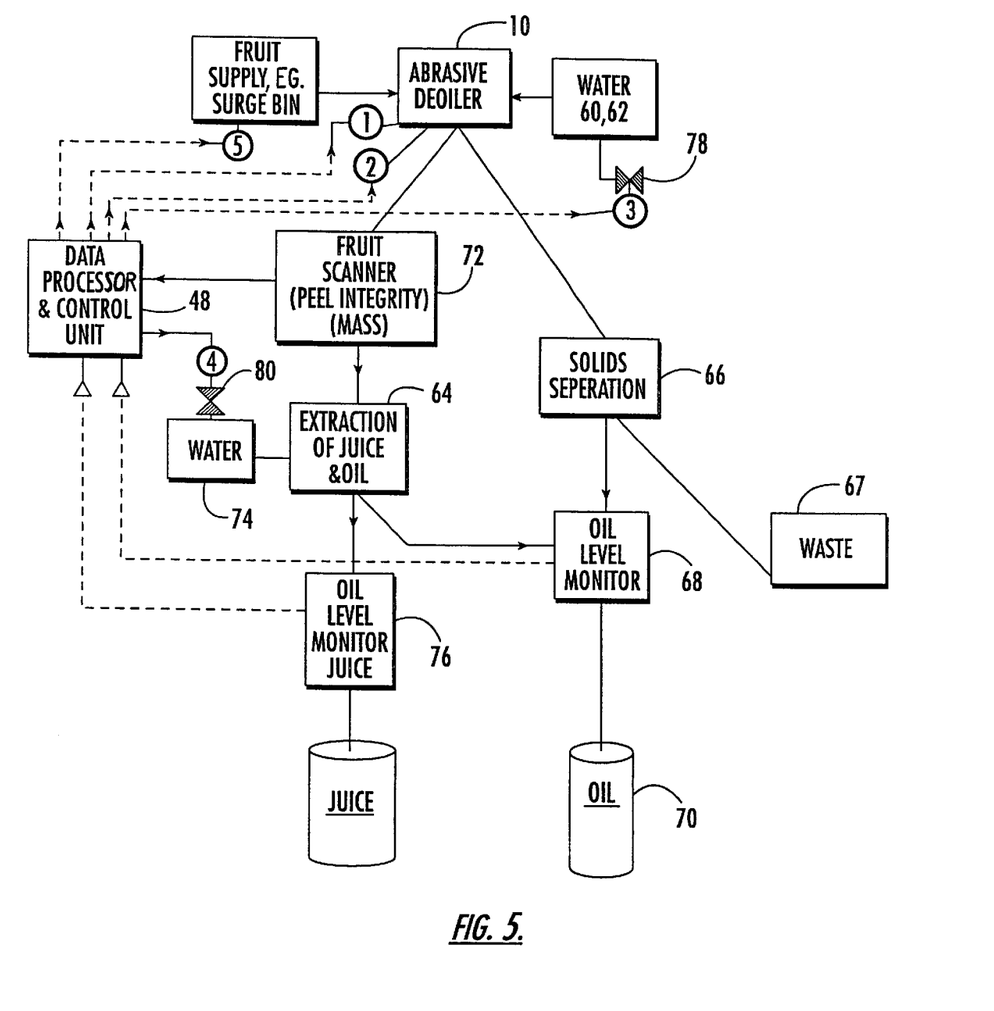
FIG. 5 is a general block diagram showing the basic components of the system in accordance with the present invention.
Figure 6:
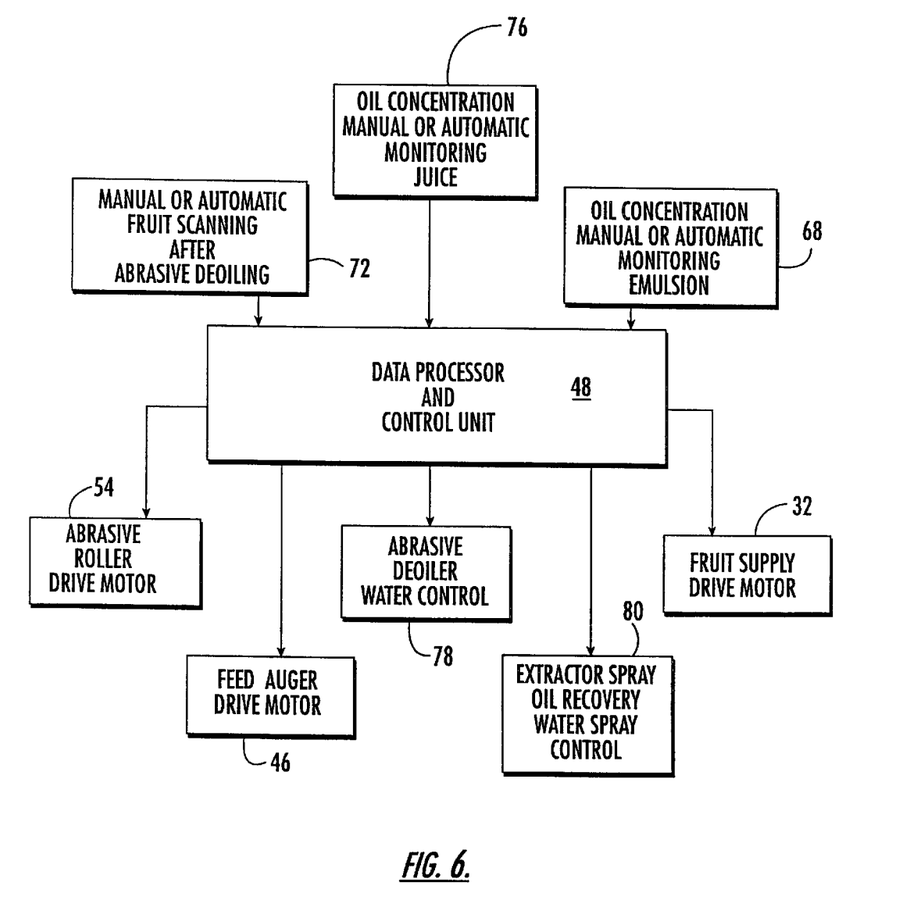
FIG. 6 is another block diagram showing inputs to the data processor and control unit and the control points used by the system of the present invention.

A feed auger 40 includes helical auger flights 42 that are mounted on a longitudinally extending central drive shaft 44 supported at either end of the peeling chamber 10. A drive motor 46 interconnects the drive shaft 44 of the feed auger 40 through an appropriate transmission and rotates the feed auger to provide a continuous and consistent feed rate to advance citrus fruit through the peeling chamber 10. The auger flights 42 are helically configured to provide a downward movement of any citrus fruit within the peeling chamber as the citrus fruit is advanced by the rotating feed auger. The drive rate of the feed auger is controlled by a data processor and control unit 48 operatively connected to the drive motor and other components as explained below (FIGS. 5 and 6).

A plurality of longitudinally extending abrasive rollers 50 are rotatably mounted in an arcuate configuration within the peeling chamber 10 at an area forming the lower portion 22 of the peeling chamber. These rollers 50 extend longitudinally along the entire length of the peeling chamber. The abrasive rollers 50 are mounted for rotation on bearing supports 52 positioned at either opposing end 16a, 16b, as shown in the end view of FIG. 4, where three rollers have been removed, leaving five rollers shown, making a total of eight rollers. Although eight rollers are used in the specific embodiment shown in the figures, an even larger number of rollers could be used to provide an abrasive contact against a citrus fruit, such as an orange or grapefruit, depending on the design configuration chosen by one skilled in the art.

Figure 4:
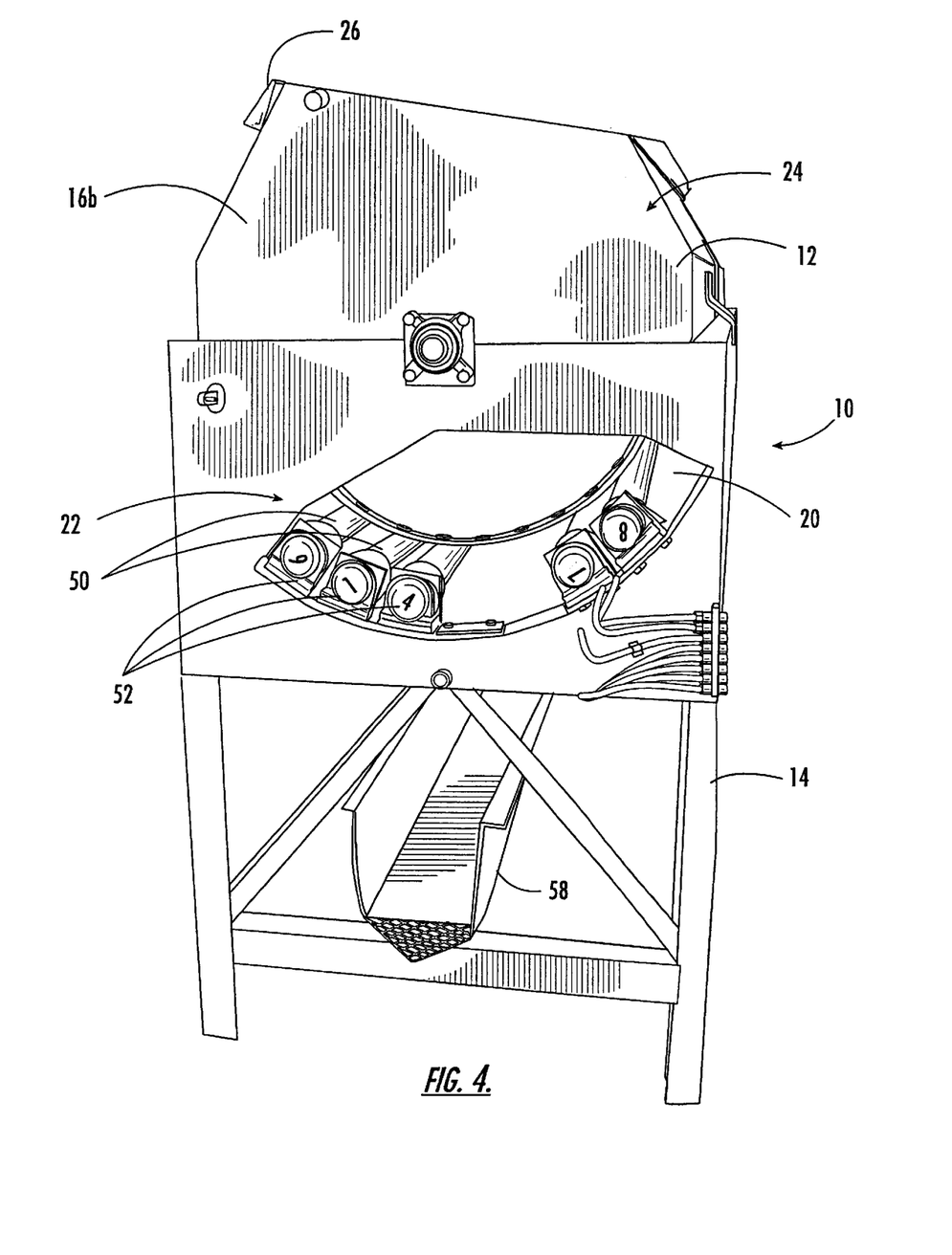
FIG. 4 is a schematic, isometric end view of the peeling chamber, showing the location of the abrasive rollers, the feed auger, the fruit outlet, and water/emulsion discharge area located below the peeling chamber.

A roller drive motor 54 interconnects the abrasive rollers 50 via transmission 56 (FIG. 1) and is connected to the data processor and control unit 48. The roller drive motor 54 rotation speed can be controlled to adjust the rotational speed of the abrasive rollers. The abrasive rollers are interconnected by the transmission 56 that interconnects all the rollers such that the one roller drive motor 54 drives all abrasive rollers. The rollers are spaced apart from each other to form a small opening between the rollers, which allows water and oil, as well as surface contaminants, such as mold, heavy debris and leaves, to pass downward between the rollers into a water and emulsion discharge chute 58 as shown in FIG. 4.

Figure 3:
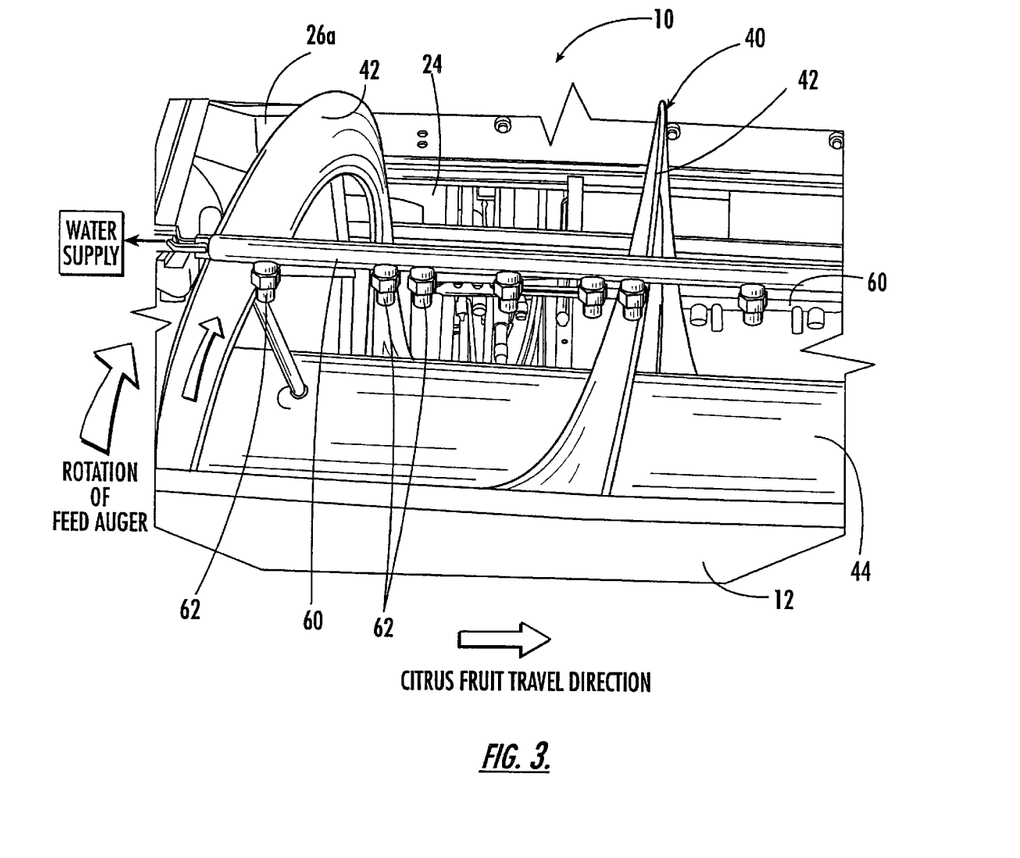
FIG. 3 is another schematic, isometric view of the inside of the peeling chamber, showing the water spray system and feed auger.

A longitudinally extending water supply pipe 60 extends along either side within the peeling chamber 10 (FIGS. 1 and 3) near the access openings 26a on the upper portion 24 of the peeling chamber 10 to allow ready access of an operator to the water supply pipe. A plurality of water spray nozzles 62 are connected to the pipe and spray into both sides of the peeling chamber for ensuring that the entire amount of advancing citrus fruit is sufficiently sprayed with water, ensuring that oil and other debris is washed down with the water into the water emulsion discharge chute 58.

In accordance with the present invention, the abrasive rollers are formed from stainless steel and have a surface texture formed from a knurl #10TPI, having a convex axial feed using right hand and left hand rollers to provide a diamond pattern. The depth of each peak is about 0.050 inches with a tolerance of about +0.00 and −0.020 inches. They are also formed from a double pass cut (two times over the roller). Each roller is about 3.9 to 4.0 inches in diameter. The surface ranges from a sharp peak to having about a 0.015 to about 0.030 inch flat on the peak.

The abrasive rollers are timed to rotate at a speed relative to the rotation speed of the feed auger, and allow a residence time of citrus fruit (i.e., the time within the chamber 10 as the fruit passes from the fruit inlet to the fruit outlet) in an amount sufficient typically to remove a majority of the oil within the citrus fruit, such as 50% to 95%, but leaving sufficient peel thickness for maintaining peel integrity, which is necessary in later processing, such as in the downstream juice extractor 64 (FIG. 1). In certain cases, it may not be necessary to remove a majority of the oil within the citrus fruit and a minority, such as 20% to 50%, could be removed. However, the present process is especially aimed to remove a majority of the oil within the citrus fruit, but leave enough for maintaining peel integrity. During final juice processing after extraction, enough oil will be removed that if any oil is desired for the final juice product, the oil can be added.

FIGS. 1, 5 and 6 disclose the basic oil concentration monitoring points and control points for the present invention. As shown, after abrasive de-oiling within the peeling chamber 10, the emulsion passes into a solids separation system 66 where the oil emulsion and trash are separated and removed. This can be a finisher as known to those skilled in the art in the fruit processing industry. There also could be multiple filter devices at this point working with the solids separation device. Once solid separation occurs, one part of the product stream passes to waste 67 (such as the leaves) and the other product stream passes as an oil emulsion into an oil concentration monitoring station 68 and then into oil recovery 70. Although monitoring can be manual, it is anticipated to be automatic. Manual monitoring would be more likely in third world countries.

The citrus fruit after abrasive de-oiling in the peeling chamber 10 passes under a fruit scanner 72 that could be an optical scanner for optically scanning the outer peel and surface of the fruit. Scanning could be visual. The scanner 72 is operatively connected to the data processor and control unit 48 and determines not only peel integrity, but also determines the number or amount of fruit processed out of the peeling chamber. From the fruit scanner 72, the fruit is fed into a juice extractor 64 as known to those skilled in the art. The juice extractor extracts juice and oil by techniques well known to those skilled in the art. An example of the basic extraction process and other associated processes used in this system is disclosed in commonly assigned U.S. Pat. No. 5,992,311 to Suter et al., the disclosure which is hereby incorporated by reference in its entirety.

At the juice extractor 64, the exterior of the fruit is supported and the peel separated therefrom by the interaction of upper and lower cups, cutters, and strainer tubes, as known to those skilled in the art. Water is supplied via a metered supply 74 and valve 76 to the extractor to aid in extracting the oil from the major parts of the fruit. After extraction of juice and oil at the extractor, the juice is monitored with oil monitoring station 76 to determine the oil concentration of the juice. This monitoring station is also connected to data processor and control unit 48.

The oil extracted with the water from the extractor is passed to oil concentration monitoring station 68. It is possible that if the juice oil concentration is high, the juice can be sent to a centrifuge for further removing of oil. However, the present invention is advantageous because with monitoring of the oil concentration at various points as shown in FIGS. 1 and 5, the drive motors can be adjusted to allow the citrus fruit to have a longer residence time within the peeling chamber and allow the abrasive rollers to rotate faster to permit enhanced abrasion and oil removal in the emulsion from the peeling chamber.

FIG. 5 shows basic components used in the system of the present invention where the fruit supply is fed into the abrasive de-oiler, i.e., the peeling chamber 10. The data processor and control unit 48 uses the fruit supply as a control point and adjusts the surge bin feed motor 32, as indicated by the control point numbered 5. The feed auger drive motor 46 and abrasive roller drive motor 54 are controlled by the data processor and control unit 48 and provides control points 1 and 2. The water system provides water to the water supply pipes and is also controlled by the data processor and control unit 48. A water valve 78 is controlled by unit 48 to increase or decrease the amount of water provided into the peeling chamber. The data processor and control unit also controls a water valve 80 that provides water into the juice extractor 64 that extracts juice and oil in the manner well known to those skilled in the art.

Various signal inputs are fed into the data processor and control unit 48 as shown in FIGS. 5 and 6. These signal inputs include the fruit scanner signal from the fruit scanner, which could be an optical scanner. The optical scanner not only counts and gives an indication of the quantity of fruit passing through the peeling chamber, but also provides an indication of the integrity of the peel for the citrus fruit. The scanner acquires an image of the surface, and based upon known databases of images and other digital signal processing systems, it can determine the integrity of the fruit surface. Other processing techniques known to those skilled in the art can be used.

The oil concentration of the juice after extraction is monitored and used as an input to the data processor and control unit 48, as well as the oil concentration for the emulsion after solid separation, both from the abrasive de-oiler and after extraction of Juice and oil from the extractor, as shown in FIG. 5.

Figure 7:
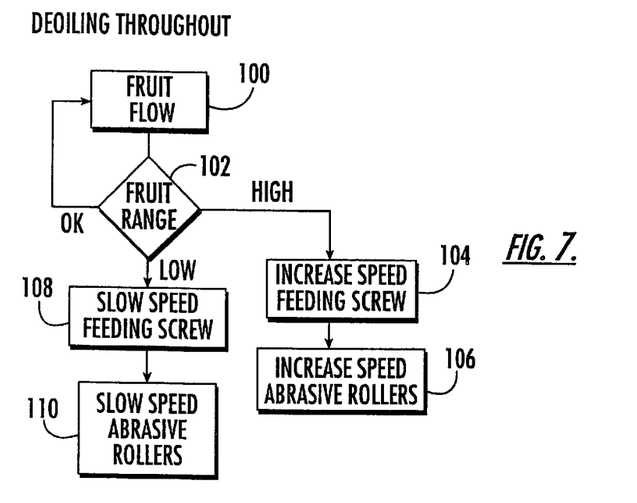
FIG. 7 is a high level flow chart showing the control logic used in de-oiling throughput.

Referring now to FIG. 7, there is illustrated a flow chart for the logic flow of a de-oiling control strategy relating to the fruit flow. This routine is used to provide an optimum amount of fruit that can be processed. Fruit flow or feed (block 100) is adjustable as noted before. If the fruit Feed range (block 102) is acceptable, no change is made. If high, and too much fruit is fed to chamber 10, then the speed of the feed auger can be increased to increase the actual speed of fruit fed into the peeling chamber (block 104), and thus, reduce the residence time of the fruit within the peeling chamber. With the decreased residence time, the aggressiveness of the abrasive rollers is increased (block 106). If the fruit feed is low, it is necessary to increase the quantity into the peeling chamber by slowing the speed of the feed auger (block 108). If the feed auger is slowed, then the speed of the abrasive rollers must be slowed (block 110) to obtain the same oil recovery. Naturally, if the speed of the feed auger is increased, the abrasive roller speed must be increased to be more aggressive and obtain the same oil recovery.

Figure 8:
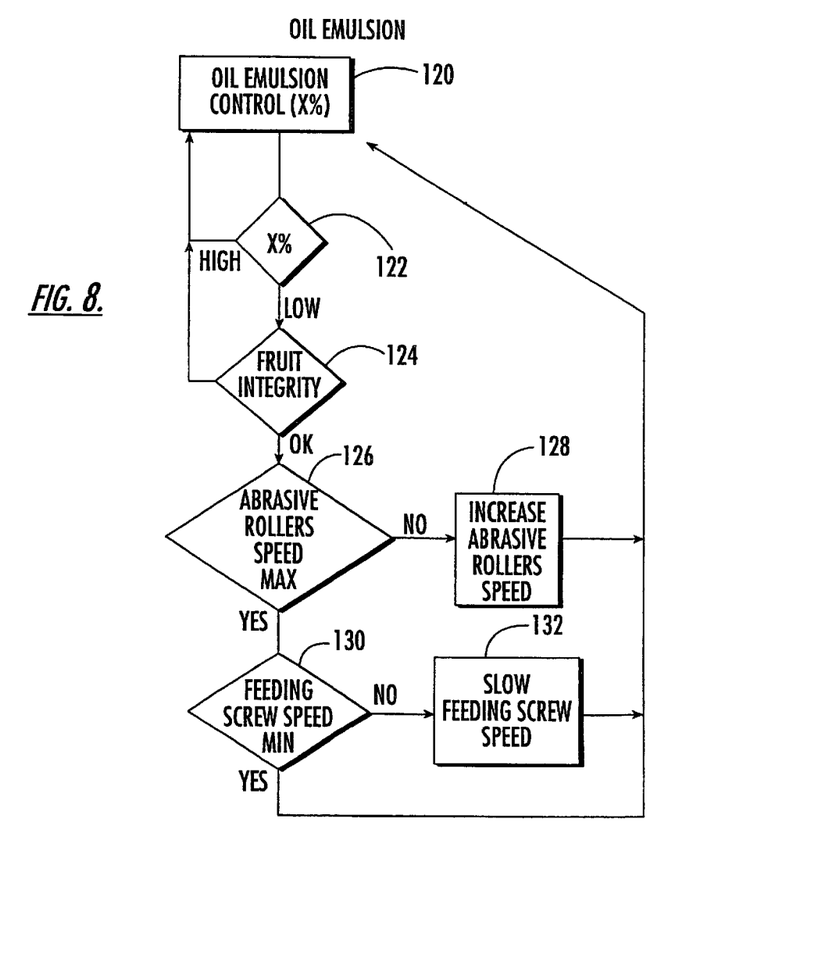
FIG. 8 is another high level flow chart showing the oil emulsion control logic.

FIG. 8 illustrates the flow chart for an oil emulsion diagram where the percentage of the oil emulsion coming from the abrasive de-oiler or peeling chamber is controlled (block 120). Sometimes, it is not desirable to obtain all oil from the citrus fruit when it is processed within the peeling chamber because the integrity of the peel is compromised. In some cases, a majority of that oil is desired. In other cases, the range can be from 20% to 95%. If the desired percentage, such as 70% (block 122), is not obtained and is low, the fruit integrity is analyzed (block 124), and if poor, the system is changed. If the fruit integrity is acceptable, a determination is made if the abrasive rollers are at maximum speed (block 126). If not, then the abrasive roller rotational speed is increased (block 128). If the abrasive rollers are at the maximum rotational speed, then a determination is made if the feed auger is at a minimum speed (block 130). If it is not, then the feed auger rotational speed is slowed (block 132). If yes, then the control loops back.

Figure 9:
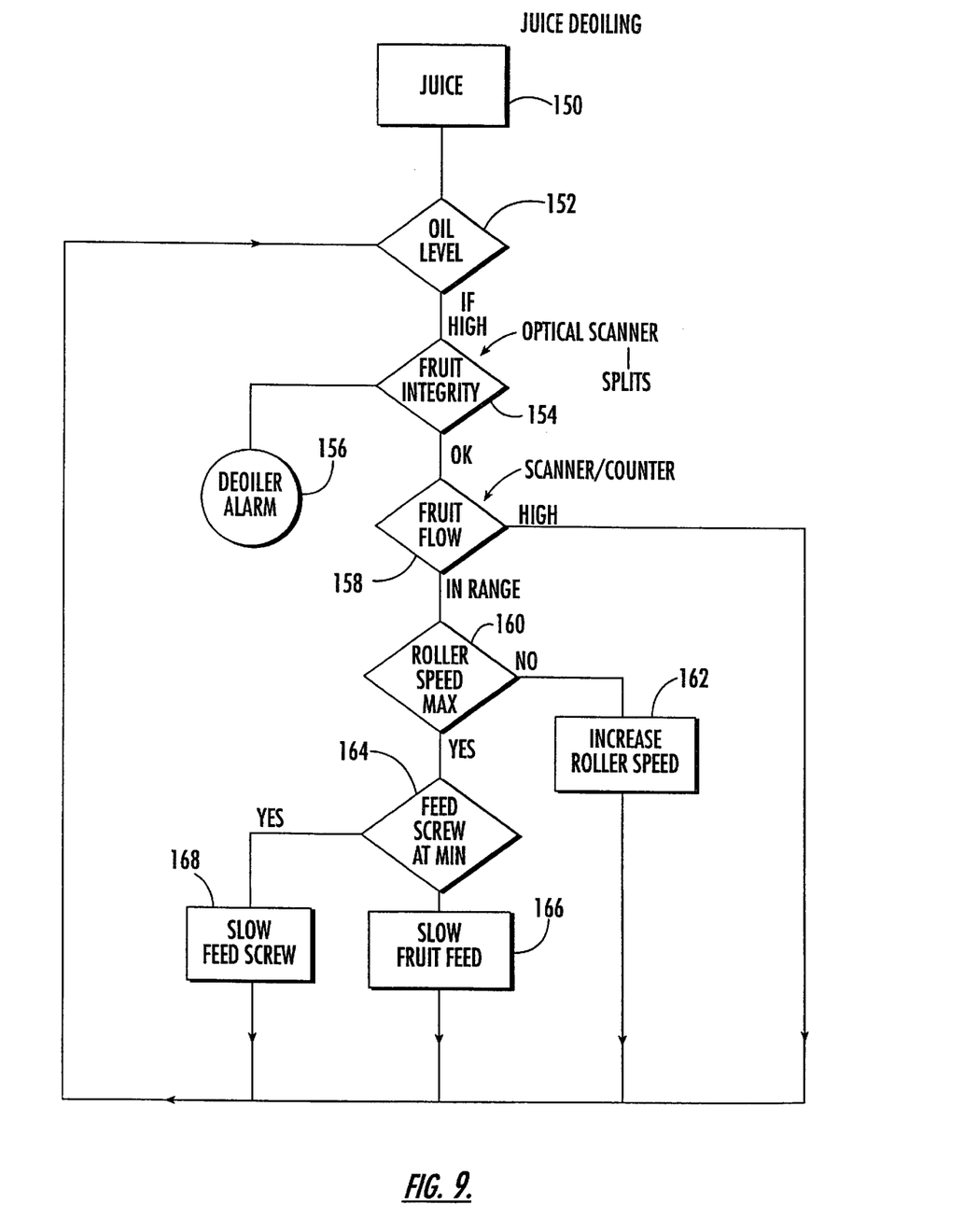
FIG. 9 is yet another flow chart showing the basic control logic used in juice de-oiling.

FIG. 9 illustrates a basic flow chart for the control parameters of juice de-oiling (block 150). The oil concentration is monitored with juice coming from the extractor (block 152), and if the oil level is high, the optical scanner or a visual observation checks the fruit integrity (block 154), and if poor, a de-oiler alarm is signaled (block 156). The operator can then make system adjustments as necessary. If the fruit integrity is acceptable, the fruit flow is checked (block 158). If high, the system loops back. If the fruit flow is in range, the roller speed is checked whether it is at maximum (block 160). If not, the roller speed is increased (block 162). If it is at maximum, then the auger is checked whether it is at minimum (block 164). If it is not, then the fruit feed is slowed (block 66), and if it is, then the auger rotation is slowed (block 168).

The present invention allows a citrus fruit processing process that can be monitored automatically in a processing environment where the controls shown in FIG. 6 are performed automatically through the data processor and control unit. In some third world countries, however, this process may not be automated and it is possible that an operator can manually check the juice and emulsion for oil concentration and manually check abrasive de-oiling and its effect on the surface of the citrus fruit and make appropriate adjustments.

The present invention is also advantageous because the use of the water spray system with the peeling chamber can reduce the necessity of another water spraying of citrus fruit that occurs inside the extractor. Also, pesticides and black mold, which are often difficult to wash off via washing, are now removed when the small amount of surface is removed. Typically, about 0.001 to about 0.005 inches or more and at times more surface can be removed. In the extracting process without the present invention, mold can flake off under the pressure of the extractor and get into juice, which is considered a major defect by the USDA and other administrative agencies. Also, a centrifuge which has very high operating costs and maintenance costs probably will not have to be used because a substantial percentage of oil is initially removed by the peeling chamber. The juice extractor can later remove other portions of the oil remaining within the peel. Also, the use of the various oil concentration monitors and fruit scanner allows greater control over the process in real time.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be Included within the scope of the dependent claims.

That which is claimed is:

1. A method of processing citrus fruit comprising the steps of:
    providing a peeling chamber having opposing ends defining a fruit inlet and fruit outlet and a plurality of abrasive rollers rotatably mounted within the peeling chamber at an area forming a lower portion of the peeling chamber; and
    feeding citrus fruit through the fruit inlet into the peeling chamber and out the fruit outlet while engaging the citrus fruit against the rotating abrasive rollers with a residence time within the peeling chamber sufficient for peeling off the outer surface of the fruit in an amount to remove at least a portion of oil within the citrus fruit while leaving sufficient peel thickness for maintaining peel integrity.

2. A method according to claim 1, and further comprising the step of engaging the citrus fruit against abrasive rollers have a surface formed as a knurl with peaks of about 0.050 inches.

3. A method according to claim 1, and further comprising the step of spraying water within the peeling chamber against the citrus fruit as the citrus fruit is urged through the peeling chamber to wash oil into a water emulsion.

4. A method according to claim 3, and further comprising the step of spraying water from both sides within the interior of the peeling chamber for ensuring that oil is washed down with the water.

5. A method according to claim 1, and further comprising the step of feeding the citrus fruit through the peeling chamber by rotating a feed auger that extends longitudinally within the peeling chamber.

6. A method according to claim 1, and further comprising the step of rotating the feed auger in a direction opposite to a rotation direction of the abrasive rollers.

7. A method according to claim 3, and further comprising the step of monitoring oil concentration within the water emulsion either manually or automatically and adjusting rotational speed of the abrasive rollers and feed rate of citrus fruit through the peeling chamber.

8. A method of processing citrus fruit comprising the steps of:
    feeding citrus fruit into a peeling chamber and into engagement with rotating abrasive rollers having a surface texture that allows a controlled removal of peel from the surface of the citrus fruit and at a residence time within the peeling chamber sufficient for removing at least a portion of the oil within the citrus fruit and leaving sufficient peel thickness for maintaining peel integrity;
    while the fruit engages the abrasive rollers, spraying water against the citrus fruit to wash oil away from the citrus fruit as an emulsion;
    monitoring oil concentration within the emulsion; and
    adjusting at least one of the residence time of the fruit within the peeling chamber, rotation speed of the abrasive rollers, or the amount of water sprayed onto the citrus fruit based upon the monitored oil concentration within the emulsion.

9. A method according to claim 8, and further comprising the step of monitoring the oil concentration within the emulsion manually.

10. A method according to claim 8, and further comprising the step of monitoring the oil concentration within the emulsion automatically.

11. A method according to claim 8, and further comprising the step of feeding the fruit from the peel chamber into a juice extractor for extracting juice and oil from the citrus fruit.

12. A method according to claim 11, and further comprising the step of monitoring the oil concentration of the fruit juice received from the juice extractor and adjusting at least one of the residence time of the fruit within the peeling chamber, the rotation speed of the abrasive rollers, the amount of water sprayed onto the citrus fruit, or amount of water used by the juice extractor based upon the monitored oil concentration of the fruit juice received from the juice extractor.

13. A method according to claim 12, and further comprising the step of monitoring the oil concentration of the fruit juice received from the juice extractor manually.

14. A method according to claim 12, and further comprising the step of monitoring the oil concentration of the fruit juice received from the juice extractor automatically.

15. A method according to claim 8, and further comprising the step of adjusting the feed rate of fruit that is fed into the peeling chamber based on the monitored oil concentration within the emulsion.

16. A method according to claim 8, and further comprising the step of scanning the surface of the citrus fruit after the fruit has passed through the peeling chamber for determining peel integrity and determining the amount of fruit passing out of the peeling chamber.

17. A method according to claim 16, and further comprising the step of adjusting at least one of the residence time of the fruit within the peeling chamber, the rotation speed of the abrasive rollers, the amount of water sprayed onto the citrus fruit, or amount of water used by the extractor based upon the determined peel integrity.

18. A method according to claim 8, and further comprising the step of engaging citrus fruit against abrasive rollers that have a surface formed as a knurl with peaks of about 0.050 inches.

19. A method according to claim 8, and further comprising the step of feeding the citrus fruit by rotating a feed auger that extends longitudinally within the peeling chamber.

* * * * *

UNITED STATES PATENT AND TRADEMARK OFFICE
CERTIFICATE OF CORRECTION

PATENT NO.    : 6,426,107 B1
DATED         : July 30, 2002
INVENTOR(S)   : Thomas et al.

It is certified that error appears in the above-identified patent and that said Letters Patent is hereby corrected as shown below:

<u>Column 7,</u>
Line 26, delete "(block 66)" substitute -- (block 166) --

Signed and Sealed this

Twenty-sixth Day of November, 2002

Attest:

Attesting Officer

JAMES E. ROGAN
*Director of the United States Patent and Trademark Office*